United States Patent
Mills et al.

(10) Patent No.: US 8,180,920 B2
(45) Date of Patent: May 15, 2012

(54) SYSTEM AND METHOD FOR PROCESSING CONTENT

(75) Inventors: Brendon W. Mills, Dallas, TX (US); Clifford L. Hall, III, Austin, TX (US); Richard G. Washington, Marble Falls, TX (US)

(73) Assignee: RGB Networks, Inc., Sunnyvale, CA (US)

( * ) Notice: Subject to any disclaimer, the term of this patent is extended or adjusted under 35 U.S.C. 154(b) by 743 days.

(21) Appl. No.: 11/549,226

(22) Filed: Oct. 13, 2006

(65) Prior Publication Data

US 2008/0091845 A1 Apr. 17, 2008

(51) Int. Cl.
*G06F 15/16* (2006.01)

(52) U.S. Cl. ........................................ 709/238; 709/246

(58) Field of Classification Search .................... 709/246
See application file for complete search history.

(56) References Cited

U.S. PATENT DOCUMENTS

| | | | |
|---|---|---|---|
| 4,509,073 A | 4/1985 | Baran et al. | 358/86 |
| 5,093,718 A | 3/1992 | Hoarty et al. | 358/84 |
| 5,220,420 A | 6/1993 | Hoarty et al. | 358/86 |
| 5,319,455 A | 6/1994 | Hoarty et al. | 348/7 |
| 5,361,091 A | 11/1994 | Hoarty et al. | 348/7 |
| 5,412,720 A | 5/1995 | Hoarty | 380/15 |
| 5,442,700 A | 8/1995 | Snell et al. | 380/15 |
| 5,485,197 A | 1/1996 | Hoarty | 348/7 |
| 5,526,034 A | 6/1996 | Hoarty et al. | 348/7 |
| 5,550,578 A | 8/1996 | Hoarty et al. | 348/7 |
| 5,557,316 A | 9/1996 | Hoarty et al. | 348/7 |
| 5,587,734 A | 12/1996 | Lauder et al. | 348/10 |
| 5,594,507 A | 1/1997 | Hoarty | 348/584 |
| 5,812,665 A | 9/1998 | Hoarty et al. | 380/10 |
| 5,822,537 A | 10/1998 | Katseff | |
| 5,883,661 A | 3/1999 | Hoarty | 348/7 |
| 5,953,506 A | 9/1999 | Kalra et al. | 395/200.61 |
| 6,034,678 A | 3/2000 | Hoarty et al. | 345/327 |
| 6,055,315 A | 4/2000 | Doyle et al. | 380/242 |
| 6,064,377 A | 5/2000 | Hoarty et al. | 345/327 |
| 6,100,883 A | 8/2000 | Hoarty | 345/327 |
| 6,205,582 B1 | 3/2001 | Hoarty | 725/93 |
| 6,253,238 B1 | 6/2001 | Lauder et al. | 709/217 |
| 6,305,020 B1 | 10/2001 | Hoarty et al. | 725/95 |
| 6,345,279 B1 | 2/2002 | Li et al. | 707/104 |
| 6,407,680 B1 | 6/2002 | Lai et al. | 341/50 |

(Continued)

FOREIGN PATENT DOCUMENTS

GB 2369203 A 5/2002

(Continued)

OTHER PUBLICATIONS

U.S. Appl. No. 11/328,587, filed Jan. 10, 2006, entitled System and Method for Routing Content, 59 pages.

(Continued)

*Primary Examiner* — Bunjob Jaroenchonwanit
(74) *Attorney, Agent, or Firm* — Baker Botts L.L.P.

(57) ABSTRACT

A system for routing media content files having different format characteristics to a plurality of clients over a communication network includes a content translation router. The content translation router is capable of retrieving the content files. In addition, the content translation router includes processing modules for concurrently modifying content files having differing format characteristics to be compatible for transmission over the communication network for viewing at different ones of the clients.

61 Claims, 5 Drawing Sheets

U.S. PATENT DOCUMENTS

| | | | |
|---|---|---|---|
| 6,421,733 B1 | 7/2002 | Tso et al. ............. 709/246 |
| 6,490,627 B1 | 12/2002 | Kalra | |
| 6,498,897 B1 | 12/2002 | Nelson | |
| 6,510,513 B1 | 1/2003 | Danieli | |
| 6,593,860 B2 | 7/2003 | Lai et al. ............. 341/50 |
| 6,757,429 B2 | 6/2004 | Hu | |
| 6,823,082 B2 | 11/2004 | Hu | |
| 6,888,477 B2 | 5/2005 | Lai et al. ............. 341/50 |
| 6,904,168 B1 | 6/2005 | Steinberg | |
| 6,938,157 B2 | 8/2005 | Kaplan | |
| 6,963,972 B1 | 11/2005 | Chang | |
| 6,970,602 B1 | 11/2005 | Smith et al. ............. 382/232 |
| 7,088,823 B2 | 8/2006 | Fetkovich | |
| 7,093,277 B2 | 8/2006 | Perlman ............. 725/142 |
| 7,734,800 B2 | 6/2010 | Gupta | |
| 2001/0056460 A1 | 12/2001 | Sahota et al. ............. 709/201 |
| 2002/0006204 A1* | 1/2002 | England et al. ............. 380/269 |
| 2002/0087957 A1* | 7/2002 | Norris et al. ............. 717/163 |
| 2002/0120586 A1* | 8/2002 | Masaki et al. ............. 705/75 |
| 2002/0129140 A1 | 9/2002 | Peled | |
| 2002/0131496 A1 | 9/2002 | Vasudevan | |
| 2002/0138848 A1 | 9/2002 | Alao | |
| 2002/0172418 A1 | 11/2002 | Hu | |
| 2002/0194227 A1 | 12/2002 | Day | |
| 2003/0004880 A1 | 1/2003 | Banerjee et al. ............. 705/51 |
| 2003/0053702 A1 | 3/2003 | Hu | |
| 2003/0061369 A1 | 3/2003 | Aksu | |
| 2003/0105739 A1 | 6/2003 | Essafi | |
| 2003/0158969 A1 | 8/2003 | Gimson et al. ............. 709/246 |
| 2003/0185395 A1 | 10/2003 | Lee | |
| 2003/0196206 A1 | 10/2003 | Shusman ............. 725/91 |
| 2004/0003117 A1 | 1/2004 | McCoy et al. ............. 709/246 |
| 2004/0086039 A1* | 5/2004 | Reynolds et al. ............. 375/240.01 |
| 2004/0111476 A1 | 6/2004 | Trossen et al. ............. 709/206 |
| 2004/0133548 A1 | 7/2004 | Fielding | |
| 2004/0133927 A1 | 7/2004 | Sternberg | |
| 2004/0139233 A1 | 7/2004 | Kellerman et al. ............. 709/246 |
| 2004/0193648 A1* | 9/2004 | Lai et al. ............. 707/104.1 |
| 2005/0004997 A1 | 1/2005 | Balcisoy | |
| 2005/0060411 A1 | 3/2005 | Coulombe | |
| 2005/0132264 A1* | 6/2005 | Joshi et al. ............. 715/500.1 |
| 2005/0172127 A1 | 8/2005 | Hartung et al. ............. 713/167 |
| 2005/0198210 A1* | 9/2005 | Janik ............. 709/219 |
| 2005/0213826 A1 | 9/2005 | Neogi | |
| 2005/0265395 A1 | 12/2005 | Kim et al. ............. 370/485 |
| 2005/0273598 A1 | 12/2005 | Silverbrook | |
| 2005/0286497 A1 | 12/2005 | Zutaut et al. ............. 370/352 |
| 2006/0015649 A1 | 1/2006 | Zutaut et al. ............. 709/246 |
| 2006/0026302 A1* | 2/2006 | Bennett et al. ............. 709/246 |
| 2006/0117379 A1 | 6/2006 | Bennett | |
| 2006/0136457 A1 | 6/2006 | Park | |
| 2006/0167803 A1 | 7/2006 | Aydar | |
| 2006/0168227 A1 | 7/2006 | Levine | |
| 2006/0168323 A1 | 7/2006 | Kim et al. ............. 709/238 |
| 2006/0179472 A1* | 8/2006 | Chang et al. ............. 726/2 |
| 2006/0242318 A1 | 10/2006 | Nettle | |
| 2006/0265657 A1* | 11/2006 | Gilley ............. 715/730 |
| 2007/0067725 A1 | 3/2007 | Cahill | |
| 2007/0124816 A1* | 5/2007 | Abigail ............. 726/24 |
| 2007/0162945 A1 | 7/2007 | Mills | |
| 2007/0186005 A1 | 8/2007 | Setlur | |
| 2007/0255659 A1* | 11/2007 | Yen et al. ............. 705/51 |
| 2008/0016185 A1 | 1/2008 | Herberger | |
| 2008/0091845 A1* | 4/2008 | Mills et al. ............. 709/246 |
| 2008/0141303 A1 | 6/2008 | Walker | |
| 2008/0195698 A1 | 8/2008 | Stefanovic | |
| 2008/0195761 A1 | 8/2008 | Jabri | |
| 2008/0231480 A1 | 9/2008 | Lai | |
| 2008/0235200 A1 | 9/2008 | Washington | |
| 2009/0013414 A1 | 1/2009 | Washington | |
| 2009/0083279 A1 | 3/2009 | Hasek | |
| 2009/0119322 A1 | 5/2009 | Mills | |
| 2009/0232220 A1 | 9/2009 | Neff | |
| 2010/0070608 A1 | 3/2010 | Hosur | |
| 2010/0094931 A1 | 4/2010 | Hosur | |
| 2010/0185776 A1 | 7/2010 | Hosur | |

FOREIGN PATENT DOCUMENTS

| | | |
|---|---|---|
| WO | 99/07158 | 2/1999 |
| WO | 02/082271 | 10/2002 |
| WO | 03/032136 | 4/2003 |
| WO | 03/073370 | 9/2003 |
| WO | 2004/077790 | 9/2004 |
| WO | 2005/006768 | 1/2005 |
| WO | 2005/046140 | 5/2005 |
| WO | 2006/134310 | 12/2006 |
| WO | 2007/053957 | 5/2007 |
| WO | 2007/063485 | 6/2007 |
| WO | 2009/024926 | 2/2009 |

OTHER PUBLICATIONS

Jun Xin, Chia-Wen, Lin, and Ming-Ting Sun, "Digital Video Transcoding," *Proceedings of the IEEE*, vol. 93, No. 1, pp. 84-97, Jan. 2005.

"Akimbo adds RSS feeds to video-on-demand service," *Online Reporter*, No. 455, 2 pages, Aug. 6, 2005.

Alan Bezoza and Brian Coyne, "How the Internet Will Disrupt the Long-Term Video Value Chain," *Friedman, Billings, Ramsey & Co., Inc.*, 27 pages, Oct. 6, 2005.

U.S. Appl. No. 11/936,548 entitled, System and Method for Managing Content, filed Nov. 7, 2007, 35 pages.

U.S. Appl. No. 12/578,773, Office Action dated Dec. 13, 2010, Hosur.

U.S. Appl. No. 12/208,122, Office Action dated Oct. 29, 2010, Hosur.

U.S. Appl. No. 11/772,582, Office Action dated Dec. 21, 2010, Washington.

U.S. Appl. No. 11/772,582, Office Action dated Jun. 28, 2010, Washington.

U.S. Appl. No. 11/688,936, Office Action dated Aug. 7, 2009, Washington.

U.S. Appl. No. 11/328,587, Office Action dated Dec. 10, 2010, Mills.

U.S. Appl. No. 11/328,587, Office Action dated Jul. 8, 2010, Mills.

U.S. Appl. No. 11/328,587, Office Action dated Apr. 16, 2009, Mills.

U.S. Appl. No. 11/328,587, Office Action dated Sep. 19, 2008, Mills.

U.S. Appl. No. 11/936,548, Office Action dated Nov. 7, 2008, Mills.

U.S. Appl. No. 11/936,548, Office Action dated Jan. 5, 2010, Mills.

APEC eSecurity Task Group, "Guidelines to Issue Certificates Capable of Being Used in Cross Jurisdictional eCommerce," *APEC*, Dec. 2004.

Färber, Nikolaus et al., "Adaptive progressive download based on the MPEG-4 file format," *Journal of Zhejiang University Science* A (Suppl I), 2006.

Kantarci, Aylin et al.; "Rate adaptive video streaming under lousy network conditions;" *Signal Processing: Image Communication 19*, Mar. 22, 2004.

PCT Notification of Transmittal of the International Search Report and the Written Opinion of the International Searching Authority, or the Declaration with attached PCT International Search Report and the Written Opinion of the International Searching Authority in International Application No. PCT/US2008/055079, Sep. 4, 2008.

PCT Notification of Transmittal of the International Search Report and the Written Opinion of the International Searching Authority, or the Declaration with attached International Search Report and the Written Opinion of the International Searching Authority in International Application No. PCT/US2009/060590, Jan. 22, 2010.

PCT Notification of Transmittal of the International Search Report and the Written Opinion of the International Searching Authority, or the Declaration with attached PCT International Search Report and the Written Opinion of the International Searching Authority in International Application No. PCT/US2009/056310, Nov. 17, 2009.

PCT Notification of Transmittal of the International Search Report and the Written Opinion of the International Searching Authority, or the Declaration with attached PCT International Search Report and the Written Opinion of the International Searching Authority in International Application No. PCT/US2010/021474, Apr. 26, 2010.

Schierl, Thomas et al.; "Mobile Video Transmission Using Scalable Video Coding;" *IEEE Transactions on circuits and Systems for Video Technology*; 17:9; pp. 1204-1217, Sep. 2007.

Singer et al., "ISO Media File format specification," *International Organisation for Standardisation ISO/IEC* 14496-1:2001/Amd. 3, Oct. 31, 2008.

\* cited by examiner

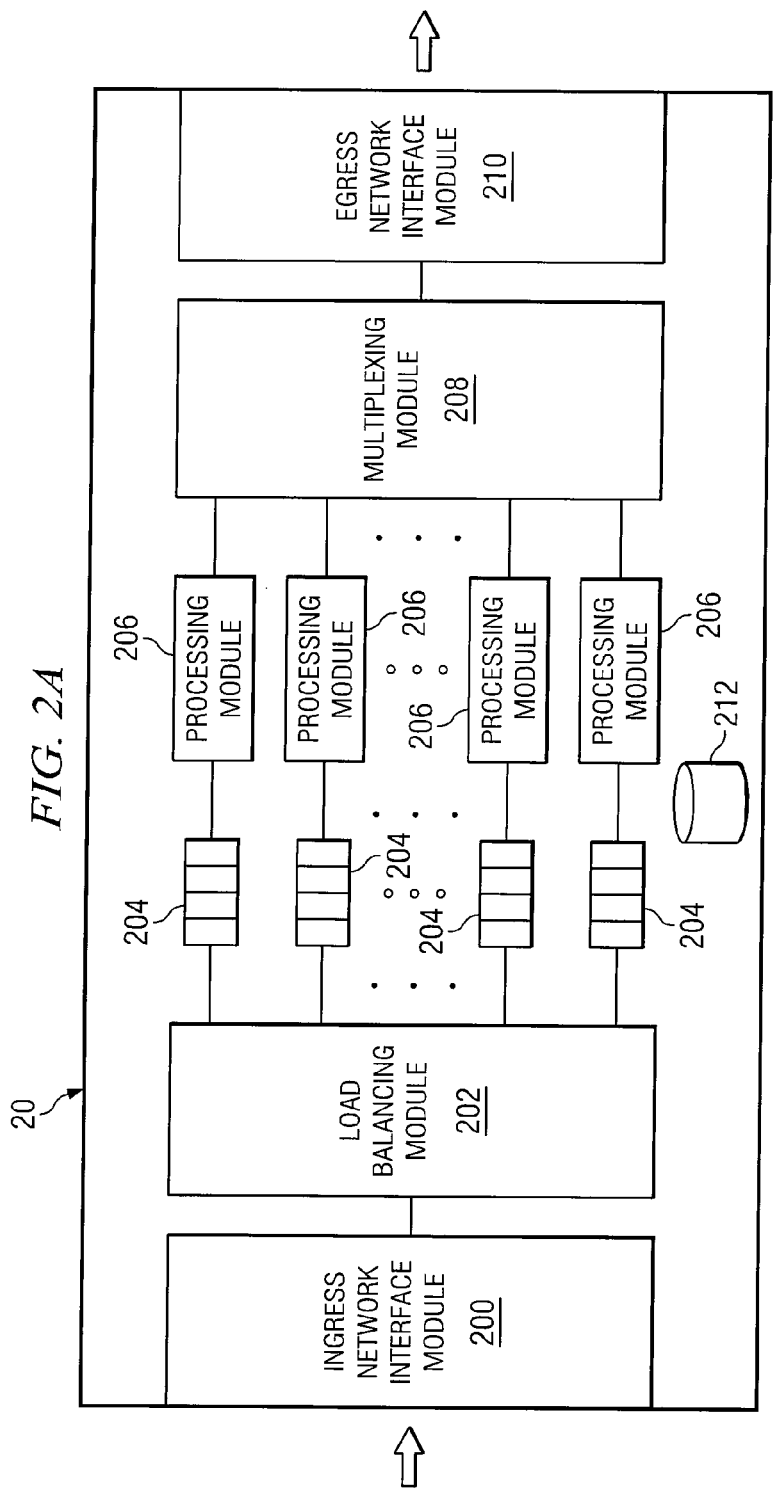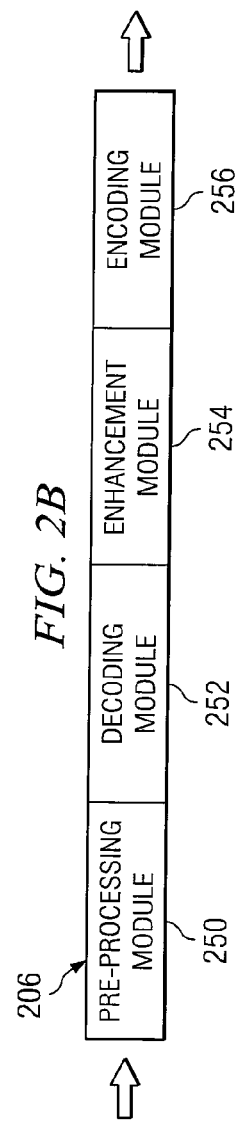

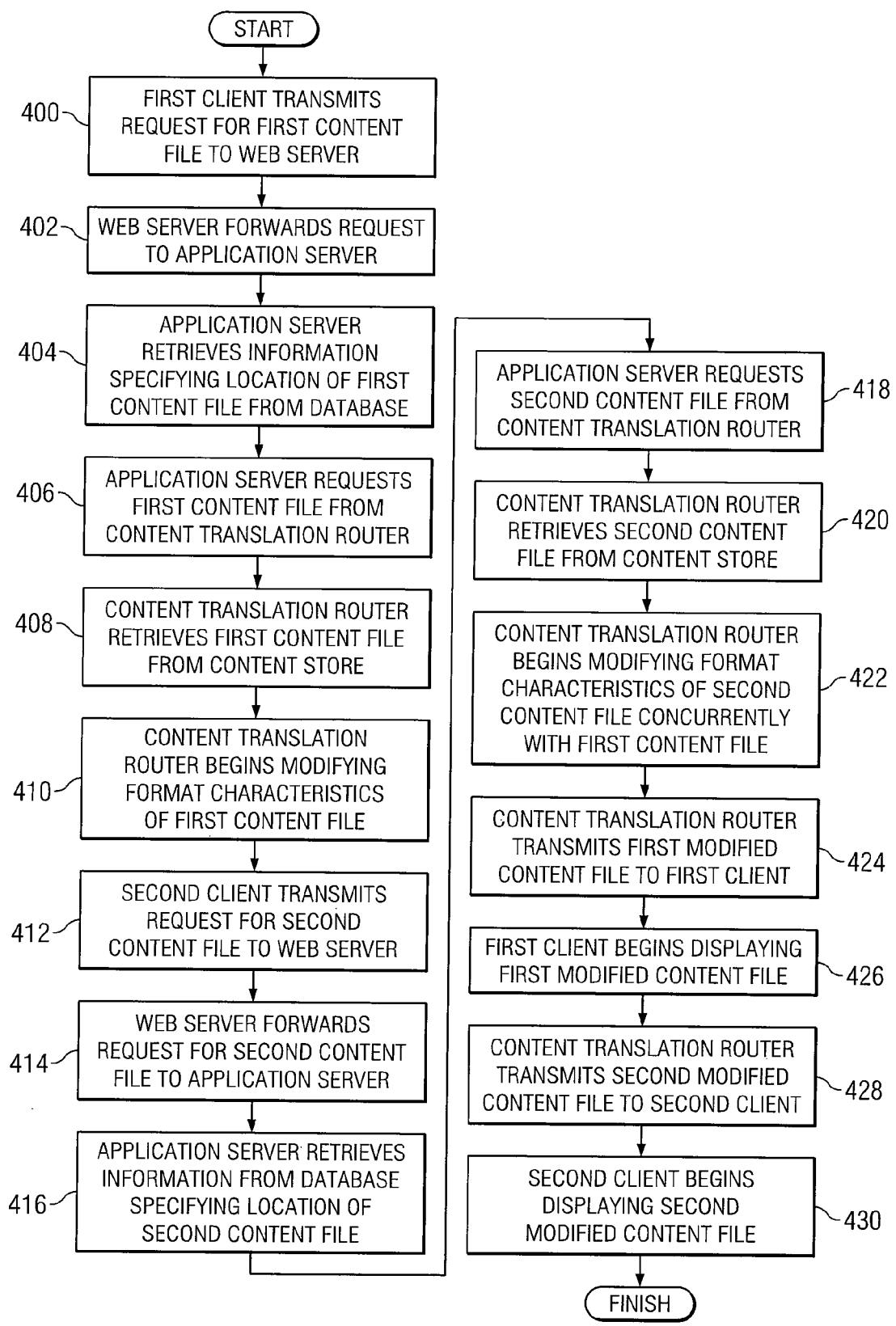

SYSTEM AND METHOD FOR PROCESSING CONTENT

TECHNICAL FIELD OF THE INVENTION

This invention relates in general to media-content delivery systems, and more particularly, to a method and system for routing and translating media content.

BACKGROUND OF THE INVENTION

Recent years have seen significant growth in the variety and availability of audio, video, and multimedia content. The proliferation of internet sites and the introduction of new media platforms including cellphones, personal data assistants, and other portable media players, have led to an increased demand for content delivery in a variety of different formats. Likewise, the rapid growth in user-generated content has created a large supply of media content available to users in a large number of disparate formats.

Converting content from a source format provided by a content source to a different target format supported by a particular media player can be time-consuming and computationally-intense. Moreover, the wide variety of source and target formats available can result in slow content-delivery, create congestion in content-processing components, and require ever increasing storage capabilities.

SUMMARY OF THE INVENTION

In accordance with the present invention, the disadvantages and problems associated with content delivery systems have been substantially reduced or eliminated. In particular, a content-delivery method and system is disclosed that provides flexible techniques for expanding the quantity and type of content available to users, and enabling large amounts of media content to be efficiently and effectively managed and stored.

In accordance with one embodiment of the present invention, a system for routing media content files having different formed characteristics to a plurality of clients over a communication network includes a content translation router. The content translation router is capable of retrieving the content files. In addition, the content translation router includes processing modules for concurrently modifying content files having differing format characteristics to be compatible for transmission over the communication network for viewing at different ones of the clients.

In accordance with one embodiment of the present invention, a method for routing media content files to a plurality of clients over a communication network includes receiving a plurality of content files having different format characteristics and concurrently modifying the format characteristics of selected ones of the content files to be compatible for transmission over the communications network and for reproduction at selected clients.

Technical advantages of certain embodiments of the present invention include the ability to provide several types of content to display devices possessing varying capabilities. Additionally, particular embodiments of the present invention may significantly increase content available to media players, allow for parallel transcoding, transrating, and/or processing of content from multiple sources, and reduce system complexity by centralizing content processing on a single dedicated component. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2A is a functional diagram of a content translation router (CTR) that may be utilized in particular embodiments of the systems shown in FIGS. 1A and 1B;

FIG. 2B is a functional diagram of an example processing module that may be utilized in particular embodiments of the CTR shown in FIG. 2A;

FIG. 4 is a flowchart detailing an example operation of the CTR.

DETAILED DESCRIPTION OF THE INVENTION

Figure 1A:
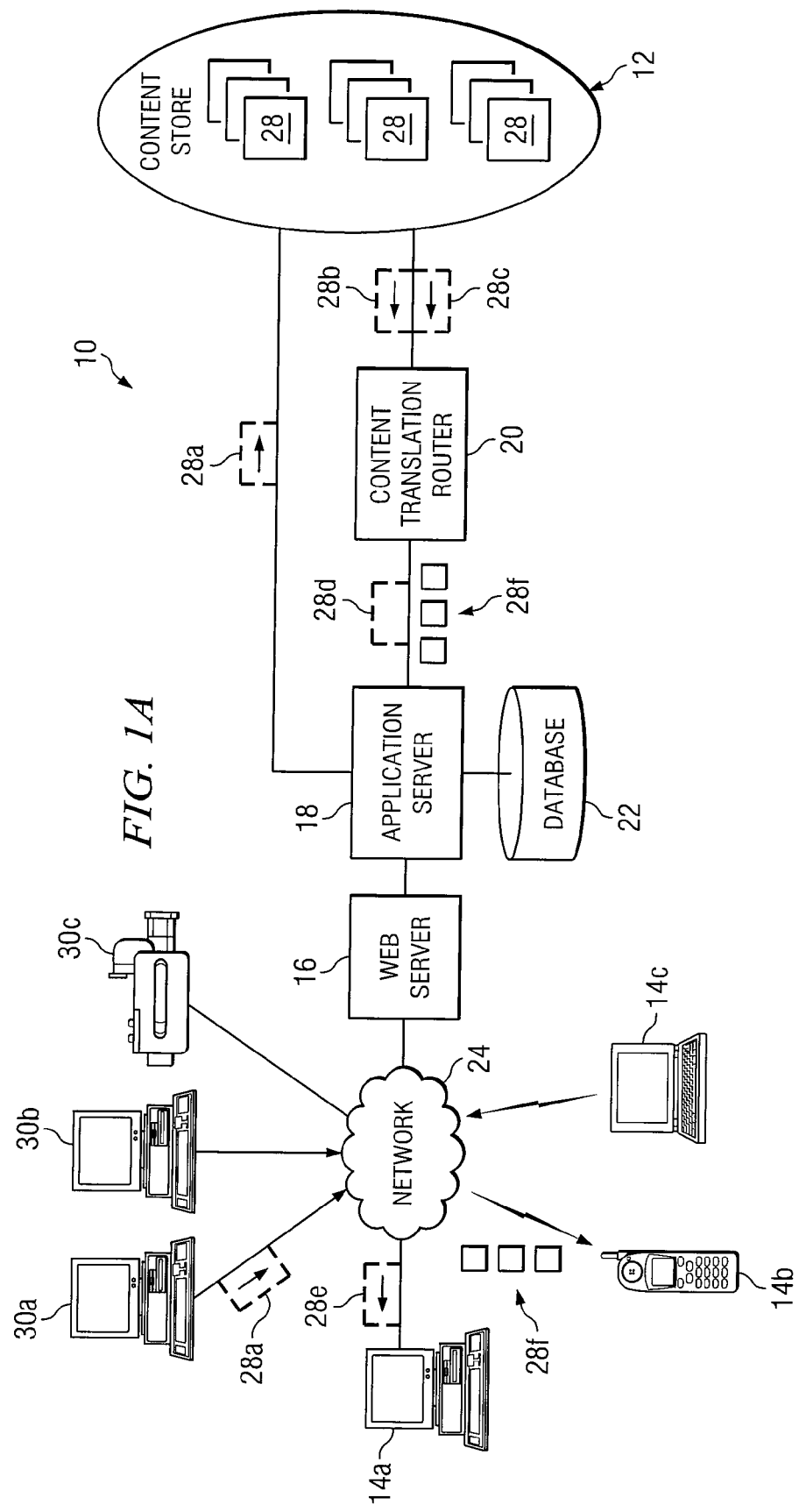
FIG. 1A illustrates a particular embodiment of a system for providing media content from multiple content sources to multiple clients through a content router.

FIG. 1A illustrates a particular embodiment of a system 10 for providing media content from content store 12 to clients 14a-c. Content store 12 is connected through a content translation router (CTR) 20, under control of an application server 18 and database 22 to a web server 16. Web server 16 provides content to a network 24 for distribution to clients 14a-c. CTR 20 is responsible for modifying content stored in content store 12 for transmission over network 24 to clients 14a-c and/or for display by clients 14a-c. Moreover, in particular embodiments, CTR 20 is capable of simultaneously modifying multiple sets of content in parallel. As a result, as discussed in further detail below, transcoding, transrating, and other types of processing of media content can be accomplished and managed more expediently and with a smaller commitment of system resources. Although FIG. 1A illustrates a particular embodiment that includes particular components that are each configured to provide certain functionality, alternative embodiments may include any appropriate combination components with the described functionality divided between the components in any suitable manner.

Ones of clients 14a-c may require different media formats or media types for proper display or usage. For example, 14a may comprise a computer, which requires different media formatting than does a video enabled cellphone 14b or a portable communication device 14c. CTR 20 converts or modifies media content stored in content store 12 to a type and/or format appropriate for transmission to and/or display by a particular client 14a-c. CTR 20 may modify the media content by translating, transcoding, transrating, encoding, rendering, and/or processing or otherwise modifying the relevant content to the requirements of a particular client 14a-c. As specific examples, CTR 20 may modify content by changing the codec, bit-rate, associated communication protocol, type of storage medium, compression, and/or digital rights management information of the relevant content. CTR 20 then transmits the modified media content to the particular client 14a-c. The contents and operation of a particular embodiment of CTR 20 are discussed in greater detail below with respect to FIG. 2A.

Content store 12 stores media content and other information to be provided to users when displaying media content on clients 14a-c. As used in this description and the claims that follow, media content may include any suitable form of voice, non-voice audio, and/or video information or data that may be viewed, listened to, stored or otherwise displayed by users of clients 14a-c. In the illustrated embodiment, content store 12 stores media content in the form of media content file 28 that may represent media content structured in any appropriate manner. Examples of media content files 28 include Moving Picture Experts Group (MPEG), Windows Media Video (WMV), Audio Video Interleave (AVI), and Quicktime video files; audio content such as Waveform audio (WAV), MPEG-1 Audio Layer 3 (MP3), and/or Windows Media Audio (WMA) files; image data such as Joint Photographic Experts Group (JPEG) or Tagged Image File Format (TIFF) files; and/or content of any other appropriate type or format. For example, a particular embodiment of CTR 20 may be specifically configured to store and retrieve media in such formats as Microsoft DV, Video for Windows, DirectShow, QuickTime, MPEG-2, MPEG-4, Windows Media, DivX, MP3, PCM WAV, AVISynth script, Audio Compression Manager (ACM), Macromedia Flash, RealVideo, VOB (DVD-Video image), Windows bitmap (BMP), TGA, TIFF, Portable Network Graphics (PNG), and JPEG and, when requested, process, modify, or convert the stored media for output as one or more of an MPEG-2, MPEG-4, or SDI-encoded video stream to clients 14a-c. As but one example, videos originally generated with a video camera using a QuickTime format might be converted by CTR 20 into an MPEG-4 format for convenient viewing by a user of a computer 14a.

Content store 12 represents and includes any appropriate type of memory devices. Content store 12 may comprise, for example, any collection and arrangement of volatile or non-volatile, local or remote devices suitable for storing data, such as for example random access memory (RAM) devices, read only memory (ROM) devices, magnetic storage devices, optical storage devices, or any other suitable data storage devices. In particular embodiments, content store 12 represents a storage area network (SAN) to which content files 28 are uploaded. Such a SAN may receive and store, for example, video and sound files from a plurality of different sources, the files having a variety of different formats and characteristics.

In addition, although FIG. 1A illustrates an embodiment of system 10 that includes a content store 12 in which content is stored in content files 28, alternative embodiments of system 10 may be configured to support the streaming of content from a content source 30 to a requesting client 14. In such embodiments, content may be streamed from an appropriate content source 30 to CTR 20 for transcoding and then delivered to the requesting client 12 as a stream or as a content file 28. As a result, system 10 may not include any form of content store 12.

Web server 16 hosts webpages which provide delivery of content to clients 14a-c in response to requests to upload and/or download media content. Application server 18 supports certain applications associated with the uploading and downloading of media content. Web server 16 and application server 18 may represent any appropriate combination of software and/or hardware suitable to provide the described functionality. Although shown in FIG. 1A as separate components, in particular embodiments, web server 16 and application server 18 may, as noted above, represent functionality provided by the same physical component.

Database 22 stores location information and metadata for media content stored in content store 12. In particular embodiments, application server 18 may access database 22 to determine a location in content store 12 from which to retrieve requested media content or to which received media content should be stored. Database 22 may be located within application server 18 or in memory devices located elsewhere within system 10.

Clients 14a-c display content retrieved from content store 12 to users, such as subscribers to a web site or other organization. Clients 14a-c may each represent any type of device appropriate to display one or more type of content that is utilized in system 10. Examples of clients 14a-c may include, but are not limited to, computers, video-enabled telephones, media players (such as audio- and/or video-capable iPods), televisions, and portable communication devices. In general, however, clients 14a-c may include any appropriate combination of hardware and/or software suitable to provide the described functionality. Clients 14a-c may couple to network 24 through a dedicated connection, wired or wireless, or may connect to network 24 as needed to access media content. For example, clients 14a-c, such as portable media players, may connect temporarily to network 24 to download media files 28 but then disconnect before displaying content from the downloaded content files 28. Although FIG. 1A illustrates, for purposes of example, a particular number and particular types of clients 14a-c, alternative embodiments of system 10 may include any appropriate number and suitable type of clients 14a-c.

Content sources 30a-c provide media content, such as content files 28a, to system 10. Content from content sources 30a-c is uploaded through the network 24 to content store 12 and made available for display at clients 14a-c. For example, media content such as video and audio files may be entered into a content source 30, such as a computer, and sent over network 24 to be stored in content store 12 for subsequent access by a plurality of users through clients 14a-c. Content sources 30 may include any form of media generation and/or capture devices, such as personal computers, video cameras, camera-enabled telephones, audio recorders, and/or any other device capable of generating, capturing, or storing media content. Although FIG. 1A shows only content sources 30a-c, it will be understood that system 10 can accommodate very large numbers of content sources 30 and large numbers of content files 28. Although the description below focuses on embodiments of system 10 in which content originates from content sources 30, system 10 may utilize content that originates at and/or is provided to content store 12, or system 10 generally, in any appropriate manner. For example, content store 12 may include, or be configured to accept, detachable storage media, such as compact discs (CDs) or digital video discs (DVDs). In such embodiments, content may be introduced into system 10 as a result of detachable storage media containing content files 28 being coupled to or accessed by content store 12. More generally, however, content may be provided to system 10 in any appropriate manner.

Network 24 represents any form of communication network supporting circuit-switched, packet-based, and/or any other suitable type of communication. Although shown in FIG. 1A as a single element, communication network may represent one or more separate networks, including all or parts various different networks that are separated and serve different groups of clients 14a-c. Network 24 may include routers, hubs, switches, gateways, call controllers, and/or any other suitable components in any suitable form or arrangement. In general, network 24 may comprise any combination of public or private communication equipment such as elements of PSTN, a global computer network such as the internet, a local area network (LAN), a wide-area network (WAN), or other appropriate communication equipment.

In operation, web server 16, application server 18, and CTR 20 interact to satisfy requests from clients 14a-c for content stored in content store 12. In the illustrated example embodiment, content is uploaded from content sources 30 to system 10 in the form of content files 28. After being stored in content store 12, content files 28 may be requested by a particular client 14a-c. CTR 20 may then modify or change the requested content file or files 28 for transmission to and display by the requesting client 14a-c.

More specifically, in the illustrated embodiment, content files 28, such as content file 28a, are uploaded from a content source 30, such as content source 30a, by transmitting the relevant content file 28a through network 24 to web server 16. For example, web server 16 may host a Hypertext Markup Language (HTML) form that a user operating content source 30a can complete and to which the user can attach content file 28a. The user may then submit the form through network 24 to web server 16 (e.g., as part of a Hypertext Transport Protocol (HTTP) "POST" request) and, as a result, transmit content file 28a to web server 16. Web server 16 then forwards the uploaded content to application server 18 to be stored on content store 12. In particular embodiments, web server 16 thus receives uploaded content as part of an HTTP POST request and redirects the request to application server 18.

Application server 18 receives content redirected by web server 16, and then processes the content for storage on content store 12. As part of this processing, application server 18 may extract information from, add information to, modify, and/or otherwise process uploaded content or any other information provided with the uploaded content as appropriate based on the configuration and capabilities of system 10. Additionally, application server 18 may perform any other additional steps to prepare the uploaded content and/or system 10 for the content to be stored in content store 12.

As one example, in particular embodiments, application server 18 may generate one or more uniform resource identifiers (URIs) to be associated with the uploaded content. A particular content file 28 may be stored as a single file in a single format but made available to clients 14a-c in any number of different output formats. Application server 18 may then generate one or more URIs that clients 14a-c may use to request a particular content file 28 in a particular format. For example, in an embodiment of system 10 that supports AVI, Windows Media, Quicktime, and MPEG-4 video formats, application server 18 may generate a separate format-specific URIs for the uploaded content file 28 for each supported output format. Application server 18 then stores, in database 22, information associating all of the generated URIs with the location in content store 12 where the uploaded content file 28 is ultimately stored.

As another example, application server 18 may scan the uploaded content to extract identifying portions or characteristics of the content. For example, in particular embodiments, application server 18 may scan uploaded content files 28 to extract certain identifying characteristics of the content contained in the uploaded content file 28 and use the extracted information to generate a "fingerprint" of the content file 28 that uniquely identifies the content contained in that content file 28.

This fingerprint may be used in a variety of ways in the overall operation of system 10. In particular embodiments, the content fingerprints may be used to ensure that multiple copies of the same content are not uploaded to system 10, thereby reducing the amount of storage needed. Application server 18 (or other appropriate components of system 10, such as CTR 20) may compare fingerprints of newly-uploaded content with fingerprints of content already existing on system 10 and, if the new fingerprint matches a fingerprint of any existing content, application server 18 may discard the newly-uploaded content. Additionally, if application server 18 is not able to match the new fingerprint to any existing fingerprints, application server 18 may save the new fingerprint to database 22 before saving the uploaded content file 28 to content store 12.

Additionally, in particular embodiments, content fingerprints may be used to support digital rights management of copyrighted material. In such embodiments, application server 18 may maintain fingerprints of copyrighted content in database 22. Application server 18 (or other appropriate components of system 10) may compare fingerprints of newly-uploaded content with fingerprints of copyrighted content stored in database 22 and, if the new fingerprint matches a fingerprint of copyrighted content maintained in database 22, application server 18 may discard the newly-uploaded content or take other steps to ensure that the rights of the copyright holder are not infringed. Furthermore, in such embodiments, application server 18 may be configured to periodically receive or generate updated fingerprints for new copyrighted content and may store the new fingerprints in database 22 for use with subsequent uploads.

In particular embodiments, components of system 10 may communicate to share fingerprinting information generated for various content files 18. For example, in particular embodiments, a dedicated device may store a fingerprint library that is accessible by application server 18, CTR 20, and/or any other appropriate devices in system 10 for purposes of identifying content during upload, download, or at other appropriate times during operation. Alternatively, application server 18, CTR 20, and/or other appropriate devices of system 10 may separately maintain databases containing fingerprinting information for content processed by those devices and may share this information with other devices that are also processing content for fingerprinting purposes. Moreover, fingerprinting information in such databases may be updated by outside sources (e.g., a content provider attempting to limit access to its copyrighted material) and/or shared between multiple systems 10. Additionally, in particular embodiments, fingerprinting information generated within system 10 may be encrypted to allow the operator of system 10 to protect this information once it has been generated.

As yet another example, in particular embodiments, application server 18 may transmit the uploaded content file 28 to CTR 20 for translation, transcoding, transrating, and/or other appropriate types of modification before being stored in content store 12. While content file 28 may, in particular embodiments, be stored in the format in which it is initially received to limit unnecessary use of CTR 20, content file 28 may, in alternative embodiments, be modified to a commonly-requested format, a space-efficient format, or another format that optimizes the use of storage space, CTR processing capacity, and/or other system resources. To achieve this, application server 18 may transmit the uploaded content file 28 to CTR 20 to be modified before being stored in content store 12. The owner of system 10 may thus configure the system to perform desired content file modification in a variety of manners, in dependence upon the owner's specifications and requirements. For example, a system owner that receives large quantities of content files, such as video and audio files, may program system 10 to store the content files with no modification, but only perform modification when a subscriber requests to receive a specific content file.

As yet another example, in particular embodiments, application server 18 may generate a graphical identifier for the uploaded content that may provide users information as to the identity of the uploaded content. For example, application server 18 may generate a thumbnail of uploaded video content. The thumbnail comprises one or a few frames of the video content, such as the first frame or another representative frame. The thumbnail may then be associated with the uploaded content and stored in content store 12, database 22, web server 16, or elsewhere on system 10. Additionally, in particular embodiments, web server 16 may incorporate the thumbnails for particular video content in web pages offering the video content to users. Users may then use the thumbnails to identify and select desired video content from system 10.

After application server 18 completes any appropriate processing of the uploaded content, application server 18 transmits the uploaded content to content store 12 for storage on content store 12. In particular embodiments, application server 18 may also update database 22 to reflect the storage location of the uploaded content. For example, as discussed above, application server 18 may, in particular embodiments, generate URIs or other identifiers representing the various formats in which an uploaded content file 28 will be made available to users. As a result, application server 18 may store, in database 22, information sufficient to allow application server 18 to determine the actual location of the uploaded content file 28 in response to a request that identifies the uploaded content file 28 by one of the generated URIs.

As noted, once application server 18 has stored the uploaded content in content store 12, the uploaded content will be available for users to download, stream, and/or access in other manners supported by system 10. Moreover, once stored, the content is available, in particular embodiments, in all of the output formats supported by CTR 20. As a result, in particular embodiments, there is no need to invest the time necessary to convert the uploaded content to all of the supported output formats before making the uploaded content available to users. Because CTR 20 can support the processing of multiple content files 28 in parallel, as discussed in greater detail below, particular embodiments of system 10 can respond to user requests for particular output formats in real-time and only a single format of content file 28 may be stored in content store 12.

Additionally, in particular embodiments of system 10, additional steps may be completed to make the content available to users. For example, a webpage may be generated through which a user can request access to the uploaded content. The webpage may include one or more of URIs generated by application server 18 that allow the requesting user to select a particular output format in which to receive the requested content.

After the content has been uploaded and made available to users, users may then request delivery of the content to their associated clients 14*a-c* for display at their particular client 14*a-c*. Users may request delivery of particular content to their associated client 14*a-c* in any appropriate manner based on the configuration and capabilities of system 10 and the relevant client 14*a-c*. Moreover, a user may request delivery using elements of the client 14*a-c* itself (e.g., a keyboard or user interface associated with client 14*a-c*) or other components associated with client 14*a-c* (e.g., the remote control for a set-top box that is attached to a television).

As indicated above, in particular embodiments, web server 16 may host one or more webpages that include links through which a user can requests particular content be delivered to the associated client 14 in a particular output format. For example, web server 16 may host a webpage through which a user can request delivery of a particular requested content file 28. The webpage may include a set of links with each link associated with the URI of a particular output format in which content file 28 is available. By selecting and/or clicking the link associated with the desired output format, the user can request delivery of the requested content file 28 in the requested output format. More specifically, the user might generate an HTTP POST request indicating the desired content file 28 and, if appropriate, the desired output format for delivery.

Once the user requests particular content, web server 16 forwards the request, or otherwise communicates the identity of the requested content, to application server 18. In embodiments that utilize HTTP, web server 16 may redirect the HTTP POST request received from the user to application server 18. Application server 18 then requests the file from CTR 20.

As part of making the request, web server 16 may determine the location of the requested content or other information that may be needed to identify the requested content to CTR 20. For example, in particular embodiments, application sever 18 may access database 22 to retrieve information indicating the storage location of the requested content file 28. In particular, a POST request received from the user may include a URI for the requested content file 28 in a requested output format. Application server 18 may resolve the actual storage location of the requested content file 28 or the name by which content store 12 recognizes the requested content file 28 based on the received URI and information stored in database 22.

Application server 18 then transmits a request to CTR 20 for the requested content. The request may be of any appropriate form based on the configuration and capabilities of application server 18 and CTR 20. In particular embodiments, application server 18 generates an HTTP request that identifies a requested content file 28 to be delivered and an output format in which to deliver the requested content file 28. Application server 18 then transmits the HTTP request to CTR 20.

CTR 20 receives the request and retrieves the requested content from content store 12. For example, in particular embodiments, content store 12 may represent a distributed file system and CTR 20 may access content store 12 using the Network File System (NFS) to retrieve the requested content file 28. As another example, in particular embodiments, content store 12 may represent or include a file transfer protocol (FTP) server, and CTR 20 may utilize FTP to retrieve the requested content file 28 from content store 12. In general, however, CTR 20 may retrieve the requested content in any appropriate manner based on the configuration and capabilities of CTR 20 and content store 12.

If appropriate, CTR 20 then begins modifying relevant characteristics of the requested content to make the content suitable for transmission across the relevant portion of network 24 and/or for display on the requesting client 14*a-c*. As discussed above, this modification may involve translating the requested content between a native format and a requested format, transrating the requested content, transcoding the requested content, or otherwise modifying the requested content. For example, CTR 20 may retrieve a content file 28 stored in a native Quicktime format at 8 Mbit/s and convert the requested content file 28 to Windows Media Video format at 2 Mbit/s to make the requested content file 28 suitable for transmission over a wireless network to a video-enable mobile phone acting as the requesting client 14*b*.

Additionally, because CTR 20 may service a system 10 that includes a significant number of clients 14a-c requesting content for transmission over networks having a variety of different transmission requirements and for display in a large number of different formats, the translation functionality provided CTR 20 may be critical to the overall throughput of system 10. Thus, in particular embodiments, CTR 20 may be configured for parallel operation. Consequently, CTR 20 may be able to begin modifying a first content file 28b for delivery to a first client 14 while simultaneously modifying a second content file 28c for delivery to a second client 14. Moreover, the modification process for the second content file 28c may be independent of the modification process performed on the first content file 28b and modifications performed on second content file 28c may be entirely different from the modifications performed on the first content file 28b. As a specific example, in particular embodiments, CTR 20 may be capable of initiating the transcoding and transrating of a Quicktime Video file stored at a 8 Mbit/s to an MPEG-4 file to be displayed at 2 Mbit/s, while CTR 20 is already simultaneously transcoding a Windows Media Audio file for playback as an MP3 file. A modified content file 28d is diagrammatically shown in FIG. 1A at the output of CTR 20, and a modified content file 28e is shown being delivered to client 14a in a format specifically tailored and suitable for display on client 14a. The parallel operation of CTR 20 is discussed in greater detail below with respect to FIG. 2A.

CTR 20 may determine the manner in which to modify the requested content in any appropriate fashion. As one example, in particular embodiments, CTR 20 may receive information from application server 18 indicating the appropriate form that the modified content should have for transmission to and display by the requesting client 14. Application server 18 may generate a URI or other identifier to associate with every supported output format and bit-rate to which a particular content file 28 can be converted. As a result, CTR 20 may be able to determine, based on the URI included in the HTTP request CTR 20 receives from application server 18, the output format and characteristics appropriate for modified content file 28.

Alternatively, client 14, web server 16, application server 18, CTR 20, or other suitable components of system 10 may determine, based on certain conditions or circumstances associated with the request, the appropriate output format and bit-rate in which to deliver the requested content. Thus, as another example, in particular embodiments, client 14 may only be capable of displaying requested content that is delivered in a particular format or formats. As a result, client 14 may indicate to web server 16 (or another appropriate component of system 10) the appropriate format in which to deliver content to client 14.

As yet another example, web server 16, application server 18, or CTR 20 may detect characteristics of the requesting client 14, the particular network or portion of network 24 that the requesting client 14 is communicating over, and/or any other aspect of the requesting client 14 or the request itself to determine an appropriate output format and bit-rate at which to provide the requested content to the requesting client 14. In general, however, CTR 20 may determine, in any suitable manner and based on input from any appropriate components, the proper format and characteristics for the modified content requested by the requesting client 14.

In addition to modifying content for delivery to the requesting client 14, CTR 20 may monitor requested content files 28 to ensure compliance with certain policies governing use of system 10 overall or the use of system 10 by certain clients 14. In particular, if CTR 20 determines that, based on the policies of system 10 or the policies associated with particular clients 14 (e.g., workplace policies associated with particular clients 14), a requested content file 28 includes content that is prohibited for storage on system 10, for transmission to clients 14, and/or for display by clients 14, CTR 20 may take appropriate remedial actions.

For example, in particular embodiments, CTR 20 may monitor requested content files 28 to determine whether copyrighted material has been requested. CTR 20 may utilize the fingerprinting techniques described above or other suitable techniques to determine whether a requested content file 28 includes copyrighted material. As another example, in particular embodiments, CTR 20 may monitor requested content files 28 to identify pornographic content requested by clients 14. CTR 20 may utilize distinguishing characteristics of video signals in the requested content, determinations made by human operators of system 10, and/or any other appropriate information to identify the pornographic material. If CTR 20 determines that the requested content file 28 includes copyrighted, pornographic, and/or other types of prohibited content, CTR 20 may deny the request, delete the requested content file 28, and/or take other appropriate measures to ensure the relevant policies are not violated by the request. Additionally, although described here as part of the download process, in particular embodiments, CTR 20 may additionally or alternatively be involved in the upload process to ensure that prohibited content is not uploaded to content store 12 or otherwise made available on system 10.

After modifying the requested content, CTR 20 transmits the modified content 28d to the requesting client 14. Thus, in the illustrated example, CTR 20 modifies a requested content file 28 to generate a modified content file 28d for delivery to the requesting client. CTR 20 then transmits the modified content file 28d, in whole or in part, to the requesting client 14. Although this description and the claims that follow describe CTR 20 as transmitting the modified content "to" the requesting client 14, CTR 20 may transmit the modified content to the requesting client 14 indirectly via any number of intervening components. For example, CTR 20 may transmit the modified content to application server 18, which may then forward the modified content to web server 16, which may in turn forward the modified content to the requesting client 14.

In particular embodiments, CTR 20 may transmit the modified content to the requesting client 14 as part of a progressive download. At an appropriate point during the progressive download, client 14 may begin to display the modified content 14. The progressive download then continues while the client 14 displays the modified content 14.

In particular embodiments, CTR 20 may instead transmit the modified content to the requesting client 14 as a media stream. As a result, CTR 20 may transmit modified content to the requesting client 14 at a rate determined based on the characteristics of the connection over which the requesting client 14 is receiving information from CTR 20 (or the other downstream components with which client 14 is communicating directly). An example of such a stream is illustrated in FIG. 1A as modified content stream 28f. Although, in particular embodiments, CTR 20 may be responsible for handling the streaming of modified content to the requesting client 14, in alternative embodiments, system 10 may include one or more streaming servers (not shown) responsible for generating, transmitting, and/or managing the stream of modified content to the requesting client 14. Requesting client 14 then displays modified content in real-time as it is received from CTR (or any streaming server).

Thus, the requesting client 14 displays modified content received from CTR 20 as the modified content is streamed to the requesting client 14, while downloading the modified content, after completing download of the modified content, and/or at any other appropriate time. Because of the CTR's parallel processing and dedicated transcoding capabilities, multiple clients 14 may be supplied with content from CTR 20 at the same time. Consequently, a single instantiation of CTR 20 can support a substantial number of users requesting content.

In addition, as a result of CTR's ability to provide real-time transcoding for a large number of users, system 10 can operate store content in a single output format but deliver the content in a variety of formats with little to no increase in delivery times and quality. This may result in reduced storage requirements for system 10, allow system 10 to support a greater number and variety of users than with codec-specific transcoders, and eliminate the time and expense of pre-transcoding all content to be stored on system 10. As a result, the use of CTR 20 in system 10 may provide a number of benefits. In some prior web hosting sites, as the traffic input of content media increases, additional servers and storage must be constantly added, thereby not only increasing operational costs but in some instances, creating problems in managing the heat generated by ever increasing numbers of servers. Aspects of the present system may reduce such problems.

Furthermore, because of its flexibility and scalability, CTR 20 can be easily adapted to provide content delivery in a wide variety of systems 10, operating under drastically different constraints. For example, particular embodiments CTR 20 may be configured to provide translation of audio and video content for web-based applications for delivery to a wide variety of Internet-capable clients 14. Particular embodiments of CTR 20 may also be configured to provide video transcoding at high resolutions to PC-based clients 14 while simultaneous transcoding the same content to a variety of different mobile phone formats at a lower resolution. Similarly, CTR 20 may be capable of storing low-resolution video received from those same mobile phone clients 14 in content store 12 and translating such video to higher resolution when requested by other clients 14. Moreover, particular embodiments of CTR 20 may be configured to provide the real-time transcoding of numerous content files 28 at High Definition (HD) resolution for online broadcasters. Thus, in general, CTR 20 can be adapted to provide fast and efficient content delivery in a wide range of different systems 10.

Figure 1B:
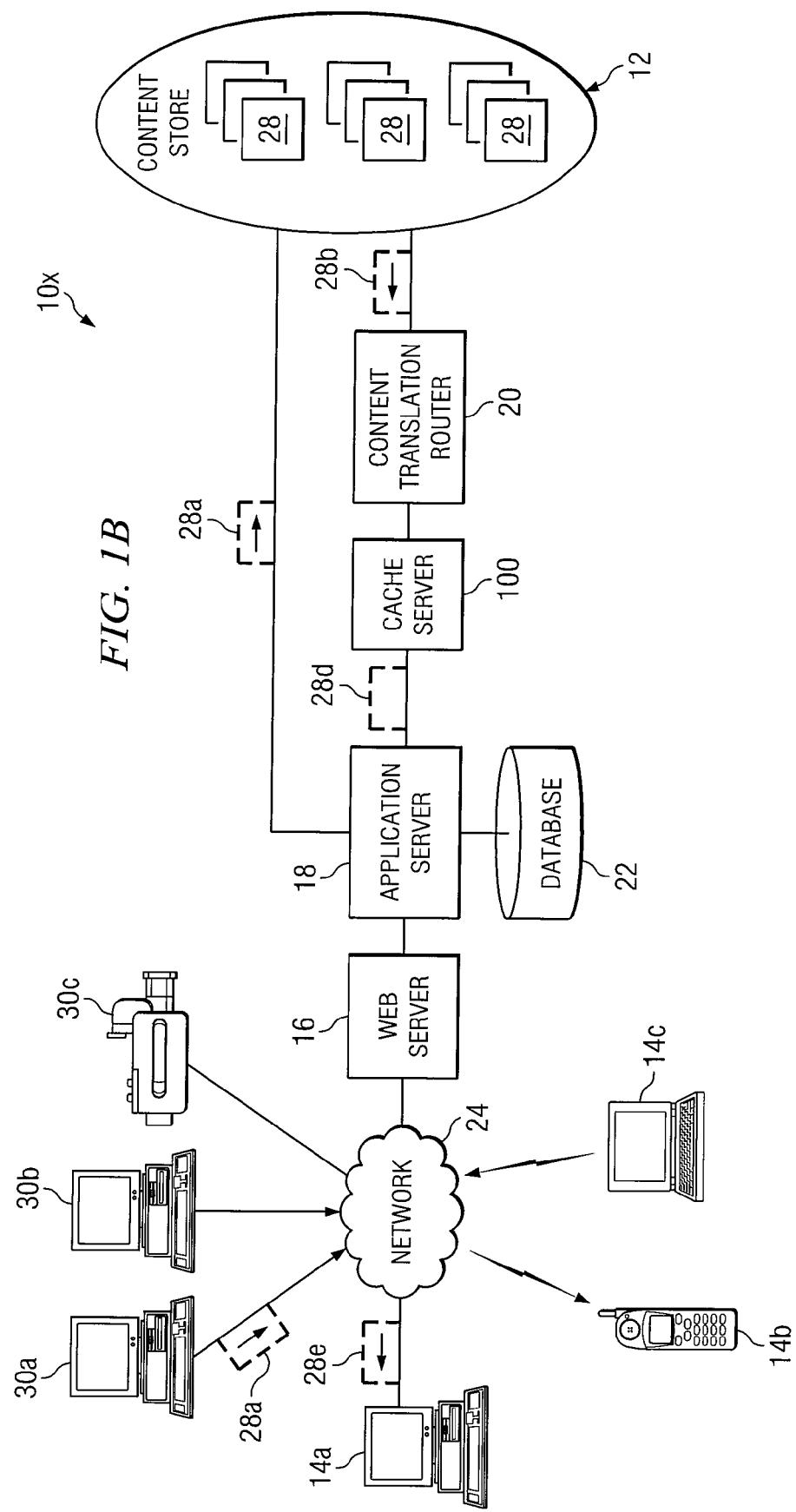
FIG. 1B illustrates an alternative embodiment of the system shown in FIG. 1A that additionally includes a cache server.

FIG. 1B illustrates an alternative embodiment of system 10, system 10x. Although, as noted above with respect to FIG. 1A, system 10 may, in general, include any appropriate combination of components, FIG. 1B illustrates one possible variation that may provide advantages to particular configurations of system 10x. In particular, as FIG. 1B illustrates, in addition to the same components as shown in FIG. 1A, system 10x includes cache server 100.

Cache server 102 receive modified content from CTR 20 and store the modified content for subsequent delivery to requesting clients 14. As a result, cache server 100 can minimize the number of times particular content is retrieved from content store 12. In embodiments in which content store 12 can be slow in retrieving content, frequently-requested content can be stored in cache server 100 thereby reducing the average amount of time a user must wait when requesting content.

In operation, the components of system 10x function similar to similarly-numbered component in system 10, as discussed above with respect to FIG. 1A. Additionally, after modifying requested content, CTR 20 transmits the modified content to one or more cache server 100. Cache server 100 then decides whether or is directed to cache the modified content. Cache server 100 also forwards the modified content on to application server 18 for delivery to the requesting client 14 (as previously described above).

Cache server 100 may utilize any appropriate techniques for determining whether to retain a copy of modified content. For example, in particular embodiments of system 10x, cache server 100 may retain a copy of all modified content received from CTR 20 until a predetermined time period expires. If the same modified content is requested again before the time period expires, the relevant cache server 100 restarts the time period and preserves its copy of the modified content. If the time expires before the modified content is requested again, the relevant cache server 100 deletes its copy of the modified content.

Application server 18 forwards subsequent requests for content through cache server 100. When cache server 100 receives a request, cache server 100 determines whether a copy of the requested content in an appropriate output format is currently stored on cache server 100. If so, cache server 100 transmits the requested content in the requested output format to the requesting client 12. If not, cache server 100 forwards the request to CTR 20 to be satisfied by modifying content in content store 12.

As a result, cache server 100 can improve the performance of system 10x. Because real-time transcoding, transrating, and the other types of modifications performed by CTR 20 may cause delays in certain instances in delivering content to clients 12, in systems where a small number of content files 28 are requested frequently in a small number of output formats, the use of cache server 100 can reduce the average delay that users experience.

Although shown in FIG. 1B as a separate component from CTR 20, in particular embodiments, cache server 100 may represent all or a portion of CTR 20. Furthermore, particular embodiments of system 10x may include multiple CTRs 20 and the described caching functionality may be distributed among the various CTRs 20. Additionally, in embodiments of system 10x where caching functionality is provided by CTR 20, CTR 20 may be responsible for caching content files 28 independent of whether CTR 20 transcodes such content files 28. As a result, when a particular content file 28 is requested from content store 12, CTR 20 may determine whether to cache that content file 28 regardless of whether CTR 20 transcodes that content file 28 in responding to the request.

FIG. 2A is a functional block diagram illustrating in greater detail the functional contents and operation of a particular embodiment of CTR 20. As illustrated, CTR 20 includes an ingress network interface module 200, a load balancing module 202, a plurality of queues 204, a plurality of processing modules 206, a multiplexing module 208, an egress network interface module 210, and a memory 212.

Ingress network interface module 200 and egress network interface module 210 couple CTR 20 to appropriate components of system 10 to facilitate, respectively, the input of content and the output of modified content by CTR 20. Additionally, in particular embodiments, ingress network module 200 and egress network module 210 may include sufficient components to allow CTR 20 to support multiple input and output flows simultaneously. Ingress network interface module 200 and egress network interface module 210 may each represent any appropriate combination of software and/or hardware suitable to provide the described functionality. Additionally, in particular embodiments, ingress network interface module 200 and egress network interface module 210 may share some or all of their respective components. For example, in the embodiment of CTR 20 illustrated in FIG. 4, a network processor 302 provides a portion of the described functionality for both ingress network interface module 200 and egress network interface module 210. In particular embodiments, ingress network interface module 200 and egress network interface module 210 each include or represent one or more network interface cards (NICs). To support multiple simultaneous content flows, each of ingress network interface module 200 and egress network interface module 210 may include multiple ports through which the interface modules 200 and 210 can receive/transmit multiple flows simultaneously.

Load balancing module 202 receives content input to CTR 20 and selects an appropriate processing module 206 at which the relevant content should be modified. Load balancing module 202 then transmits the relevant content to the selected processing module or a corresponding queue to wait until the selected processing module is available to complete the requested modification. Load balancing module 202 may include any appropriate combination of software and/or hardware suitable to provide the described functionality.

Processing modules 206 modify content received by CTR 20. In particular embodiments, processing modules 206 may be capable of translating, transcoding, transrating, and/or otherwise modifying various different types of received content to produce the appropriate form of modified content. Additionally, processing modules 206 are capable of operating concurrently so that multiple sets of content can be modified simultaneously. Moreover, particular types of modification may involve multiple iterations of modification. As a result, one or more processing modules 206 may be configured to feed their output into other processing modules 206 to achieve multi-iteration processing. This may allow for encoding to be performed in multiple passes thereby providing CTR 20 greater control over the transmission of transcoded material.

Processing modules 206 may represent or include any form of processing component, including general purpose computers, dedicated microprocessors, or other processing devices capable of processing electronic information. Examples of processing module 206 include digital signal processors (DSPs), application-specific integrated circuits (ASICs), field-programmable gate arrays (FPGAs), and any other suitable specific or general purpose processors. Although FIG. 2A illustrates a particular embodiment of CTR 20 that includes a particular number of processing modules 206, CTR 20 may, in general, include any suitable number of processing modules 206. As a specific example, in a particular embodiment, CTR 206 includes eight processing modules 206 with each processing module 206 including a DSP core. The operation of an example embodiment of processing module 206 is discussed in greater detail below with respect to FIG. 2B.

Queues 204 store retrieved content until an appropriate processing module 206 is available to modify the content. In particular embodiments, queues 204 each represent a portion of memory 212 local to a particular processing module 204 and may buffer content to be processed by that particular processing module 204. Alternatively, queues 204 may represent a centralized portion of memory 212 in which content to be processed by all processing modules 206 is buffered until an appropriate processing module 206 is available to process the content.

Multiplexing module 208 selects the outputs of the various processing modules and connects the output to egress network interface module 210 or to a particular port of egress network interface module 210. As a result, multiplexing module 208 controls the output of modified content from CTR 20. Multiplexing module 208 may include any appropriate combination of hardware and/or software suitable to provide the described functionality.

Memory 212 stores processor instructions, routing tables, and/or values and parameters utilized by CTR 20 during operation. Memory 212 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices. Additionally, because, in particular embodiments, information related to encoding and decoding new output formats can be uploaded to memory 212, CTR 20 can be updated to support additional output formats. As a result, systems 10 that utilize CTR 20 can be updated more easily and inexpensively than content delivery systems that rely on dedicated transcoders and transraters. Although shown as a single functional element in FIG. 2A, memory 212 may, as suggested above, include one or more memory devices local to and specifically associated with particular processing modules 206. For example, processing modules 206 may each comprise a circuit board that includes a DSP and a dedicated memory element that stores content, codecs, and other information to be used by that DSP during operation. In particular embodiments, all or a portion of memory 212 may represent a hard drive contained within CTR 20.

FIG. 2B is a functional diagram illustrating in greater detail the operation of a particular embodiment of the processing module 206 shown in FIG. 2A. As shown in FIG. 2B, processing module 206 may include a pre-processing module 250, a decoding module 252, an enhancing module 254, and an encoding module 256. Each of pre-processing module 250, decoding module 252, enhancing module 254, and encoding module 256 may represent any appropriate combination of hardware and/or software suitable to provide the described functionality. Additionally, pre-processing module 250, decoding module 252, enhancing module 254, and encoding module 256 may together and individually represent a single physical component or any appropriate number of separate physical components depending on the configuration of processing module 206.

In general, pre-processing module 250 receives content from content store 12 (or other appropriate sources within system 10) and transmits the requested content to decoding module 252 after any appropriate pre-processing, pre-processing module transmits the received content to decoding module 252. Decoding module 252 decodes the received content using a selected one of a plurality of codecs supported by processing module 206. Decoding module 252 then transmits the resulting raw content to enhancing module 254. Enhancing module 254 performs additional processing on the raw content to improve the quality of the content and/or to add special effects to the content. Enhancing module 254 then transmits the content to encoding module 256. Encoding module 256 then encodes the raw content using a selected one of the plurality of codecs supported by processing module 206. After encoding module 256 completes the encoding, encoding module 256 transmits the encoded content to egress network interface module 210 for delivery to a requesting client 14.

More specifically, pre-processing module 250 receives content files 28 transmitted to processing module 206 for transcoding and/or delivery to a client 14. Pre-processing module 250 may perform any appropriate decrypting, fingerprinting, filtering, logging, and/or other forms of processing to received content files 28 prior to decoding. For example, in particular embodiments, pre-processing module 250 may scan received content files 28 to determine whether the files are prohibited content (e.g., copyrighted or pornographic material) and discard, or otherwise deny a request to upload or download the relevant content file 28, if the relevant content file 28 represents or includes prohibited content. After any appropriate pre-processing, pre-processing module 250 transmits received content files 28 to decoding module 252.

Decoding module 252 decodes received content files 28 as part of transcoding these content files 28 to a requested codec for uploading or downloading. As discussed in greater detail below, decoding module 252 may have access to decoding information for a number of different codecs and, as a result, decoding module 252 may be capable of decoding content files 28 encoded using any of several different codecs. For example, in particular embodiments, each processing module 206 is coupled to a local memory element in which codecs accessible to that processing module 206 are stored. Decoding module 252 may use filename extensions, data provided by application server 18, and/or any other appropriate information to determine an appropriate codec to use in decoding the requested content. After decoding the received content file 28, decoding module 252 transmits the raw content to enhancing module 254.

Enhancing module 254 may perform any appropriate form of enhancement on the raw content received from decoding module 252. As one example, in particular embodiments, enhancing module 254 may filter the raw content to reduce signal noise. As another example, in particular embodiments, enhancing module 254 may be capable of determining a preferred resolution for the raw content and adjust the resolution to the appropriate level. As another example, in particular embodiments, enhancing module 254 may adjust the contrast in video content to ensure that transmitted video is not too bright or too dark.

In addition, enhancing module 254 may be capable of adding certain types of special effects to raw content. As one example, in particular embodiments, enhancing module 254 may receive raw content from decoding module 252 and detect the beginning and/or end of content segments within the raw content. Enhancing module 254 may then determine whether these segments fade-in/fade-out, whether these segments fade-in/fade-out at an appropriate rate, and/or whether the fade-in/fade-out characteristics of the content segment are otherwise inappropriate. If enhancing module 254 determines that a particular content segment does not fade-in/fade-out in an appropriate manner, enhancing module 254 may add fading or adjust existing fading to satisfy certain fading criteria. More generally, however, enhancing module 254 may be configured to enhance or modify raw content in any appropriate manner. After completing any appropriate enhancement, enhancing module 254 transmits the raw content to encoding module 256.

Encoding module 256 encodes raw content received from enhancing module 254. More specifically, encoding module 256 encodes raw content in a manner appropriate to facilitate transmission of the encoded content to a requesting client 14. As noted above, processing module 206 can be configured to support any number of codecs, and encoding module 256 can utilize information provided by client 14, application server 18, or any other suitable component of system 10 to determine an appropriate codec to use in encoding the requested content. As discussed above, in particular embodiments, CTR 20 receives content requests from clients 14 as HTTP requests that specify an output format for the requested content. Encoding module 256 may use this information to select an appropriate codec from among the codecs supported by processing module 206. After encoding the requested content, encoding module 256 transmits the encoded content to egress network interface module 210 for transmission to the requesting client 14.

Figure 3:
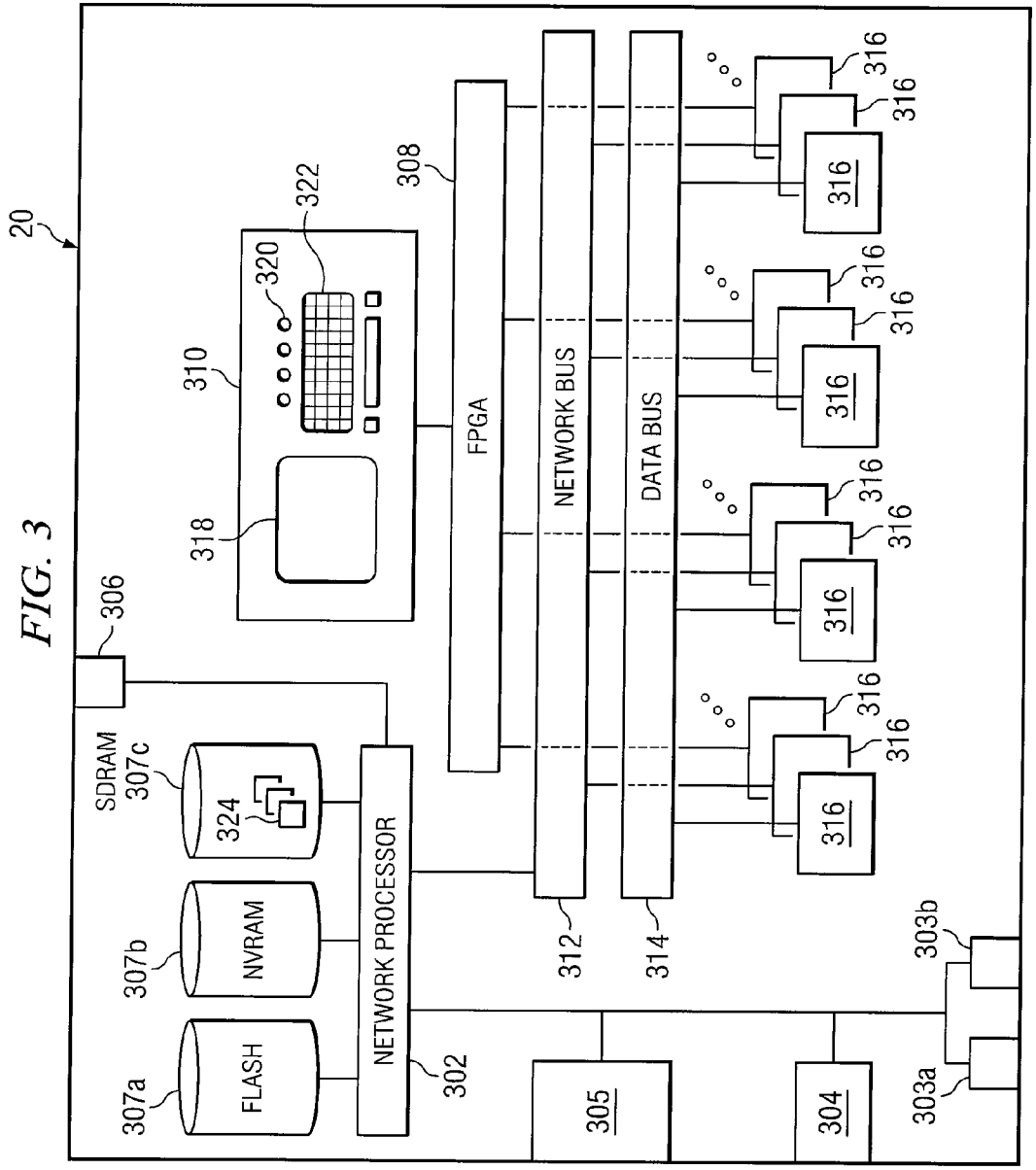
FIG. 3 illustrates in further detail the contents of a particular embodiment of the CTR shown in FIG. 2A.

FIG. 3 is a block diagram illustrating in greater detail the structural contents of an example embodiment of CTR 20 that may provide the functionality described above with respect to FIG. 2A. In the illustrated embodiment, CTR 20 includes a network processor 302, network interface ports 303a and 303b, a serial port 304, an expansion port 305, a high-speed interface 306, memory modules 307a-c, a field-programmable gate array ("FPGA") 308, a user interface 310, a network bus 312, a data bus 314, and multiple DSPs 316.

In general, DSPs 316 modify content received by CTR 20 for transmission to clients 14. Network processor 302 controls the flow of data to individual DSPs 316 and the flow of modified data from DSPs 316 back to the network 24. Meanwhile, FPGA 308 controls the operation of DSPs 316 in modifying content. In addition, network bus 312 facilitates communication of data between network processor 302 and DSPs 316, and data bus 314 facilitates communication of data between DSPs 316 and FPGA 308 and/or other DSPs 316.

Expansion port 305 allows an operator to connect a variety of different peripherals to CTR 20. As a result, various different types of interfaces may be supported for direct communication of content to CTR 20, such as Firewire, DVC (Digital Video Cassette), SDI (Serial Digital Interface), or Cameralink interfaces. Serial port 304 facilitates communication of serial data between CTR 20 and other components of system 10. This may be facilitate local debugging and/or other diagnostic functionality.

High-speed interface 306 connects CTR 20 to one or more other devices in system 10 allowing high-speed communication between CTR 20 and the connected device or devices. Particular embodiments of system 10 may include multiple CTRs 20 that connect to one another through high-speed interfaces 306. This connection may allow for distributed processing of requests for transcoded content and may facilitate caching functionality that is distributed between multiple CTRs 20 as described above with respect to FIG. 1B.

More specifically, network processor 302, in the illustrated embodiment, manages the flow of information between DSPs 316 of CTR 20 and network 24. Network processor 302 couples to network 24 through network interface ports 303a and 303b, which represents a Gigabit Ethernet (GigE) port or other physical components suitable to couple CTR 20 to a suitable communication network. In particular embodiments, network processor 302 may be responsible for performing packetization/de-packetization, encryption/decryption, header parsing, address hashing, and other tasks to support packet-based communication between DSPs 316 and other components of system 10. As one specific example, network processor 302 may represent a Freescale Network Processor.

FPGA 308 manages the operation of DSPs 316 including the assignment of transcoding, transrating, and related tasks to particular DSPs. As described in greater detail below, FPGA 308 may be capable of managing the input and output flows of DSPs 316 to allow multiple DSPs 316 to process the same content, either in parallel or serially. In particular embodiments, FPGA 308 may also be responsible for controlling operation of user interface 310 and various peripherals utilized by CTR 20.

Network bus 312 and data bus 314 facilitate communication between various components of CTR 20. More specifically, network bus 312 couples DSPs 316 and network processor 302. Network processor 302 transmits content from content store 12 to DSPs 316 over network bus 312, and DSPs transmit modified content over network bus 312 to network processor 302 for delivery to clients 14. In particular embodiments, network bus 312 represents a GigE switch.

Similarly, data bus 314 facilitates communication between DSPs 316, FPGA 308, and other appropriate components of CTR 20. DSPs 316 may use data bus 314 to transmit content in various stages of encoding and/or decoding to other DSPs 316 to be processed. Additionally, although shown in FIG. 3 as a physically discrete component, data bus 314 may represent or include portions of FPGA 308. For example, in particular embodiments, data bus 314 may represent connectivity components located within and controlled by FPGA 308. Moreover, CTR 20 may include multiple different types of data buses 314 suitable for communicating various different types of data related to the content processed by CTR 20. For example, particular embodiments of CTR 20 may include a first data bus 314 representing a Peripheral Component Interconnect Express (PCIe) switch and a second data bus (not shown) representing a video cross bar incorporated in FPGA 308.

DSPs 316 each represent appropriate processors suitable for transcoding, transrating, and/or otherwise modifying the content utilized in system 10. As one specific example, DSPs 316 may each represent a Texas Instruments DaVinci Digital Signal Processor. Although FIG. 3 illustrates a particular embodiment of CTR 20 having a particular number and configuration of DSPs 316, CTR 20 may include any number of DSPs 316, configured in any appropriate manner. For example, in particular embodiments, CTR 20 includes four groups of eight DSPs 316 for a total of thirty-two DSPs 316.

As noted above with respect to FIG. 2A, CTR 20 may include one or more memory components. Moreover, in particular embodiments, CTR 20 may include multiple different types of memory components, each utilized for the storage of particular types of information. For example, FIG. 3 illustrates a particular embodiment of CTR 20 that includes a Flash memory module 307a, a non-volatile random access memory (NVRAM) module 307b, and a synchronous dynamic random access memory (SDRAM) module 307c. These memory modules 307a, 307b, and 307c may be used to store various different types of information based on the CTR's need for or use of the relevant information. For example, CTR 20 may store critical configuration information on NVRAM memory module 307b to preserve this information in the case of device failure. Similarly, CTR 20 may store codecs to be utilized by DSPs 316 on Flash memory module 307a to minimize the amount of time required to download a particular codec to a particular DSP 316. These codecs may be loaded into individual DSP SDRAMs as a group representing the entire available codec library, as individual codecs, or any mixture thereof.

Additionally, in particular embodiments, CTR 20 may utilize one or more codecs under license and, as a result, CTR 20 may store licensing information 324 associated with the various licenses in one or more of the memory modules 307. As part of licensing information 324, CTR 20 may store a key or information that entitles a particular DSP 316 in possession of the key to utilize a particular codec in accordance with that codec's license. Memory elements local to a given DSP 316 may store one or more keys for use by that DSP 316, and a key for a particular codec may be permanently assigned to that DSP 316 or checked out from a central repository whenever the corresponding codec is used by that DSP 316. In general, however, licensing information 324 may include any appropriate information relating to codecs that CTR 20 is licensed to use for decoding and/or encoding. User interface 310 includes components capable of facilitating interaction between CTR 20 and a user or operator. In the illustrated embodiment, user interface 310 includes a display screen 318, one or more light-emitting diodes (LEDs) 320, and a keyboard 322. Display screen 318 allows a user to view content processed by CTR 20 and/or to monitor the status of CTR 20. LEDs 320 provide information about the operation of CTR 20 including current usage, available capacity, operating state, and/or any other suitable information. Keyboard 322 allows the user to configure DSPs 316, operate display screen 318, and/or interact with CTR 20 in any other suitable manner. In general, user interface 310 may include components to facilitate any suitable form of interaction supported by CTR 20.

In operation, network processor 302 receives content requests from clients 14, content files 28 from content store 12, and other information over network 24. In particular embodiments, CTR 20 supports packet-based communication and network processor 302 de-encapsulates, decrypts and/or otherwise processes received information for use by DSPs 316 and FPGA 308. Network processor 302 then transmits this information to DSPs 316 and/or FPGA 308 over network bus 312.

Additionally, as noted with respect to FIG. 2A, particular embodiments of CTR 20 may include a load balancing module 202 capable of controlling the use of processing resources in CTR 20. In particular embodiments, as described below, this functionality may be provided by network processor 302. In alternative embodiments, DSPs 316, FPGA 308, and/or any other appropriate components of CTR 20 may instead provide this functionality.

Thus, in particular embodiments, network processor 302 manages operation of DSPs 316 in modifying content files 28 for delivery to clients 14. When a content file 28 is received by CTR 20, network processor 302 selects one or more DSPs 316 to handle the requested transcoding, transrating, and/or modification and provides appropriate parameters to the selected DSPs, such as by indicating the requested codec or frame rate. In particular embodiments, the selected DSP or DSPs 316 then retrieve an appropriate codec and other data relevant to the requested modification from memory modules 307. The selected DSP or DSPs 316 then modify the content as requested and transmit the modified content file 28 back to network processor 302 for delivery to the requesting client 14.

As noted above, in particular embodiments, CTR 20 may utilize one or more of its supported codecs under license. In such embodiments, when utilizing particular codecs, DSPs 316 may access licensing information 324 to ensure compliance with the terms of the corresponding licenses. For example, in particular embodiments, a DSP 316 will retrieve, from a memory module 307 storing licensing information 324, a key associated with a particular codec that the DSP 316 needs to encode or decode a particular content file 28. If no keys are currently available, that DSP 316 may wait until another DSP 316 currently using the relevant codec completes its task and returns a key for that codec to the appropriate memory module 307. The first DSP 316 may then retrieve the key and utilize the codec as needed.

Additionally, in particular embodiments, network processor 302 may be capable of optimizing the division of work between DSPs 316. For example, DSPs 316 may be configured to allow multiple DSPs to modify the same content and respond to multiple content requests simultaneously. Thus, DSPs 316 may be configured to allow a first DSP 316 to decode a content file 28 to raw video or audio data and then transmit the decoded media to one or more other DSPs 316 for encoding in multiple different formats. For example, a first DSP 316 may decode an MPEG-4 video file to raw video and transmit the raw video to a second DSP 316 and a third DSP 316 over data bus 314. The second DSP 316 may then encode the raw video as a Quicktime file while the third DSP 316 encodes the raw video as a Windows Media Video file.

Furthermore, in particular embodiments, network processor 302 may be configured to recognize when a particular DSP 316 is utilizing less than its full processing capacity and assign additional processing tasks to that DSP 316. For example, network processor 302 may determine that a particular DSP 316 is only using 50% of its capacity in encoding a first content file. In response, network processor 302 may assign responsibility for decoding a second content file 28 to that DSP 316 and the DSP 316 may then perform both the decoding of the first content file 28 and the encoding of the second content file 28 in parallel. As a result, each DSP 316 may, at a given time, be executing instructions associated with multiple processing tasks.

More generally, network processor 302 may be capable of dividing any particular task associated with encoding, decoding, or modifying content files 28 between any appropriate combination of one or more DSPs 316, and may assign to any particular DSP 316 any combination of one or more tasks associated with encoding, decoding or modifying of various content files 28. As a result, in particular embodiments network processor 302 may be capable of optimizing the use of DSPs 316 in many different ways and provide numerous operational benefits. Nonetheless, specific embodiments of CTR 20 may provide all, some, or none of these benefits.

FPGA 308 controls the operation of data bus 314. In particular embodiments, FPGA 308 may be capable of managing the operation of data bus 314 to facilitate the joint processing of content. For example, through control of data bus 314, FPGA 308 may create a tight coupling between a particular set of DSPs 316 to optimize communication between the tightly-coupled set of DSPs 316 and enable the set to collectively complete transcoding tasks. This may be accomplished by prioritizing, on data bus 314, communication of control signals and data between DSPs 316 in a tightly-coupled set. As a result, DSPs 316 may be able to complete transcoding tasks collectively with little to no reduction in performance resulting from necessary inter-DSP 316 communication.

FIG. 4 is a flowchart illustrating operation of a particular embodiment of CTR 20 in delivering content to a plurality of requesting clients 14. Some of the steps illustrated in FIG. 4 may be combined, modified, or deleted where appropriate, and additional steps may also be added to the flowchart. Additionally, steps may be performed in any suitable order without departing from the scope of the invention.

Operation begins at step 400 with a first client 14 (assumed, for purposes of this example, to be client 14*a*) transmitting a request for a first content file 28 to web server 16. In particular embodiments, client 14*a* requests the first content file 28 from web server 16 by transmitting an HTTP request to web server 16 that identifies the requested content file 28. The HTTP request may also specify information about client 14 and/or a requested display format so that the content can be modified in a manner appropriate for transmission to and display by client 14*a*. For example, the HTTP request may include a URI uniquely associated with a specific codec and/or bit rate for the requested content.

At step 402, web server 16 forwards the request to application server 18. In particular embodiments, application server 18 retrieves information specifying a location for the first content file 28 from database 22 at step 404. For example, the HTTP request may include a URI specific to a requested codec and/or bit rate and application server may utilize information in database 22 to determine a generic name by which the requested first content file 28 is stored in content store 12.

At step 406, application server 18 then requests first content file 28 from CTR 20. In particular embodiments, application server 18 requests first content file 28 from CTR 20 by generating an HTTP request that identifies the file name or storage location of first content file 28 within content store 12 and an output format in which to deliver the requested content file 28. Application server 18 then transmits the HTTP request to CTR 20. Upon receiving the request from application server 18, CTR 20 retrieves the specified first content file 28 from content store 12 at step 408. At step 410, CTR 20 begins modifying format characteristics of the first content file 28. As noted above, this modification may include transcoding, transrating, translating, and/or any other appropriate types of modification.

Meanwhile, at an appropriate point before CTR 20 completes modification of the first content file 28, a second client 14 (assumed here to be client 14*b*) transmits a request for a second content file 28 to web server 16. While this is shown as occurring at step 412 in FIG. 4, client 14*b* may request the second content file 28 at any appropriate time after client 14*a* requests the first content file 28. Although in particular embodiments, client 14*b* may request the second content file 28 in a similar fashion to client 14*b*, such as by transmitting an HTTP request to web server 16, system 10 may include a variety of different types of clients 14, each configured to request content in a different manner.

Web server 16 forwards the request for the second content file 28 to application server 18 at step 414. As noted above, application server 18 may, in particular embodiments, retrieve information specifying the location of requested content from database 22. Thus, at step 416 in this example, application server 18 retrieves information from database 22 specifying a location or file name in content store 12 for the second content file 28. Application server 18 then requests the second content file 28 from CTR 20 at step 418.

Upon receiving the request from application server 18, CTR 20 retrieves the second content file 28 from content store 12 at step 420. At step 422, CTR 20 begins modifying format characteristics of the second content file 28. Because, in this example, CTR 20 has not yet completed modification of the first content file 28, modification of the second content file 28 overlaps with modification of the first content file 28. As a result, CTR 20 concurrently modifies both the first content file 28 and the second content file 28 during at least a portion of the time that the content files 28 are being modified.

Once CTR 20 finishes modifying the first content file 28, CTR 20 transmits a first modified content file 28 resulting from the modification of the first content file 28 to client 14*a* at step 424. As noted above with respect to FIG. 1, CTR 20 may transmit the first modified content file 28 to client 14*a* as a progressive download, as a media stream, or in any other suitable manner. Client 14*a* begins displaying the first modified content file 28 at step 426. Similarly, CTR 20 transmits a second modified content file 28 resulting from the modification of the second content file 28 to client 14*b* at step 428. Client 14*b* begins displaying the second modified content file 28 at step 430.

Although FIG. 4 illustrates operation of CTR 20 according to a particular embodiment, the operation of alternative embodiments may vary. For example, in particular embodiments, as discussed above with respect to FIG. 1A, CTR 20 may deliver content files 28 to clients 14 as a stream. Under such circumstances, CTR 20 may receive content as a stream from a content store 12 and, after any appropriate transcoding, may transmit the content to the requesting client 14 as a stream.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus comprising:
one or more memory modules that are operable to store, for each of a plurality of codecs, one or more keys for decoding or encoding content files by the codec;
a plurality of processing modules that are each operable to decode or encode content files by one or more of the codecs with their keys to be compatible with transmission to or display at particular clients, the processing modules being collectively operable to decode or encode a plurality of content files by a plurality of codecs concurrently to be compatible with transmission to or display at particular clients; and
one or more computer-readable non-transitory storage media embodying logic that is operable when executed to:
for each of a plurality of content files that are each to be decoded or encoded by one or more of the codecs, select one or more of the processing modules to decode or encode the content file by the one or more codecs;
communicate instructions to the selected ones of the processing modules for decoding or encoding the content file by the one or more codecs;
the selected ones of the processing modules being operable in response to the instructions to:
access the one of the keys in the memory modules for decoding or encoding the content file by the one or more codecs;
access the content file; and
decode or encode the content file by the one or more codecs with the accessed one of the keys
the selected ones of the processing modules being operable, if the one of the keys for decoding or encoding the content file by the one or more codecs is currently unavailable due to use by one or more other ones of the processing modules, to wait until the one of the keys is available before accessing; otherwise accessing the one or more keys immediately.

2. The apparatus of claim 1, wherein one or more of the processing modules are operable by decoding or encoding by one or more of the codecs to:
modify a first content file from a first content format to a second content format; and
modify a second content file from the first content format to a third content format.

3. The apparatus of claim 2, wherein at least portions of the first and second content files are concurrently modified.

4. The apparatus of claim 1, wherein one or more of the processing modules are operable by decoding or encoding by one or more of the codecs to:
modify a first content file from a first content format to a second content format; and
modify a second content file from a third content format to the second content format concurrently with the modification of the first content file.

5. The apparatus of claim 1, wherein one or more of the processing modules are operable by decoding or encoding by one or more of the codecs to:
modify a first content file from a first content format to a second content format; and
modify a second content file from a third content format to a fourth content format concurrently with the modification of the first content file.

6. The apparatus of claim 1, wherein decoding or encoding a content file comprises transrating one or more portions of the content file.

7. The apparatus of claim 1, wherein decoding or encoding a content file comprises transcoding one or more portions of the content file.

8. The apparatus of claim 1, wherein the logic is further operable when executed to transmit or cause to be transmitted one or more decoded or encoded portions of a content file to a particular client by streaming or causing to be streamed to a client one or more of the decoded or encoded portions of the content file.

9. The apparatus of claim 1, wherein the logic is further operable when executed to transmit or cause to be transmitted one or more decoded or encoded portions of a content file to a particular client; and
the particular client is operable to initiate display of a first one of the portions prior to receiving all the decoded or encoded portions of the content file.

10. The apparatus of claim 1, further comprising circuitry operable to generate a graphic representation of a content file based on information in the content file and transmit or cause to be transmitted the graphic representation to a particular client.

11. The apparatus of claim 10, wherein the graphic representation comprises a thumbnail representation of a portion of the content file.

12. The apparatus of claim 1, further comprising a content store for storing a plurality of content files.

13. The apparatus of claim 1, further comprising a cache for storing one or more decoded or encoded portions of one or more content files.

14. The apparatus of claim 13, wherein decoded or encoded portions of content files are stored in the cache in response to a frequency of requests by clients for the decoded or encoded portions of the content files.

15. The apparatus of claim 1, the logic is further operable when executed to:
determine whether a content file comprises prohibited content; and
if the content file comprises prohibited content, deny a request associated with the content file.

16. The apparatus of claim 15, wherein the request is to download the content file.

17. The apparatus of claim 15, wherein the request is to upload the content file.

18. The apparatus of claim 15, wherein the logic is further operable when executed to determine whether the content file comprises prohibited content by determining whether the first content file comprises copyrighted content.

19. The apparatus of claim 15, wherein the logic is further operable when executed to determine whether the content file comprises prohibited content by determining whether the content file comprises pornographic content.

20. The apparatus of claim 15, wherein the logic is further operable when executed to determine whether the content file comprises prohibited content by:
scanning the content file to generate an identifier for the content file; and comparing the identifier to one or more prohibited-content identifiers.

21. The apparatus of claim 1, wherein at least one of the processing modules is operable to:
    determine whether fading characteristics of a content file satisfies one or more predetermined fading criteria; and
    adjust the fading characteristics if they do not satisfy the predetermined fading criteria.

22. The apparatus of claim 1, wherein at least one of the processing modules is operable to:
    determine a preferred resolution for a content file; and
    adjust a resolution of the content file to match substantially the preferred resolution.

23. A method comprising:
    for each of a plurality of content files that are each to be decoded or encoded by one or more of a plurality of codecs, selecting one or more of a plurality of processing modules, wherein the plurality of processing modules are each operable to decode or encode content files using one or more of the codecs with one or more of a plurality of keys stored in a memory module to be compatible with transmission to or display at particular clients; the processing modules being collectively operable to decode or encode a plurality of content files by a plurality of codecs concurrently to be compatible with transmission to or display at particular clients;
    communicating instructions to the selected ones of the processing modules for decoding or encoding the content file by the one or more codecs;
    by the selected ones of the processing modules:
        accessing the one of the keys in the memory modules for decoding or encoding the content file by the one or more codecs;
        accessing the content file; and
        decoding or encoding the content file by the one or more codecs with the accessed one of the keys
        each of the selected ones of the processing modules being operable, if all keys required by a particular processing module are currently in use by other processing modules, to wait until a processing module with the key completes its task and returns the key to the memory module before accessing; otherwise accessing the one or more keys immediately.

24. The method of claim 23, wherein the content files are only encoded or decoded in response to a request from one of the clients.

25. The method of claim 23, wherein the encoded or decoded portions of the content files are stored after encoding or decoding.

26. The method of claim 23, and further comprising:
    caching one or more decoded or encoded portions of one or more content files in response to predetermined criteria.

27. The method of claim 26, predetermined criteria comprising the frequency of requests for the decoded or encoded portions of the content files by clients.

28. The method of claim 23, the clients comprising computers connected by a communication network, and the content files comprise video files transmitted to a central location, and
    the video files are decoded or encoded for transmission to the computers over the communication network.

29. The method of claim 23, wherein encoding or decoding each of the plurality of content files comprises:
    decoding a first content file using a first processing module into information, the first content file having a first content format; and
    encoding the decoded information from the first content file into a second content file using a second processing module, the second content file having a second content format.

30. The method of claim 29, further comprising:
    concurrently encoding the decoded information from the first content file into a third content file using a third processing module, wherein the third content file has a third content format.

31. The method of claim 23, further comprising:
    determining whether a first content file comprises prohibited content; and
    denying a request associated with said first content file if the first content file comprises prohibited content.

32. The method of claim 31, denying a request associated with the first content file comprising denying a request to download the first content file.

33. The method of claim 31, denying a request associated with the first content file comprising denying a request to upload the first content file.

34. The method of claim 31, wherein determining whether a first content file comprises prohibited content comprises determining whether the first content file comprises copyrighted content.

35. The method of claim 31, wherein determining whether a first content file comprises prohibited content comprises determining whether the first content file comprises pornographic content.

36. The method of claim 31, determining whether a first content file comprises prohibited content comprising:
    scanning the content file to generate an identifier for the content file; and
    comparing identifier to one or more identifiers.

37. The method of claim 23, concurrently encoding or decoding each of the content files comprising encoding or decoding each of the content files into a particular format using a processing module associated with that particular format.

38. The method of claim 23, further comprising:
    determining whether fading characteristics of a content file satisfies one or more predetermined fading criteria; and
    adjust the fading characteristics if they do not satisfy the predetermined fading criteria.

39. The method of claim 23, further comprising:
    determining a preferred resolution for a content file; and
    adjusting a resolution of the content file to match the preferred resolution.

40. A system comprising:
    for each of a plurality of content files that are each to be decoded or encoded by one or more of a plurality of codecs, first means for selecting one or more of a plurality of second means, wherein the plurality of second means are each operable to decode or encode content files using one or more of the codecs with one or more of a plurality of keys stored in a third means to be compatible with transmission to or display at particular clients; the second means being collectively operable to decode or encode a plurality of content files by a plurality of codecs concurrently to be compatible with transmission to or display at particular clients;
    means for communicating instructions to the selected ones of the second means for decoding or encoding the content file by the one or more codecs;
    the selected ones of the seconds means being operable to:
        access the one of the keys in the third means for decoding or encoding the content file by the one or more codecs;

access the content file; and
decode or encode the content file by the one or more codecs with the accessed one of the keys;
the selected ones of the second means being operable, if the one of the keys is currently unavailable due to use by one or more other ones of the second means, to wait until the one of the keys is available before accessing otherwise accessing the one or more keys immediately.

41. The system of claim 40, wherein one or more of the second means are operable by decoding or encoding by one or more of the codecs to:
modify a first content file from a first content format to a second content format; and
modify a second content file from the first content format to a third content format.

42. The system of claim 41, wherein at least portions of the first and second content files are concurrently modified.

43. The system of claim 40, wherein one or more of the second means are operable by decoding or encoding by one or more of the codecs to:
modify a first content file from a first content format to a second content format; and
modify a second content file from a third content format to the second content format concurrently with the modification of the first content file.

44. The system of claim 40, wherein one or more of the second means are operable by decoding or encoding by one or more of the codecs to:
modify a first content file from a first content format to a second content format; and
modify a second content file from a third content format to a fourth content format concurrently with the modification of the first content file.

45. The system of claim 40, wherein decoding or encoding a content file comprises transrating one or more portions of the content file.

46. The system of claim 40, wherein decoding or encoding a content file comprises transcoding one or more portions of the content file.

47. The system of claim 40, further comprising means for transmitting or causing to be transmitted one or more decoded or encoded portions of a content file to a particular client by streaming or causing to be streamed to a client one or more of the decoded or encoded portions of the content file.

48. The system of claim 40, further comprising means for transmitting or causing to be transmitted one or more decoded or encoded portions of a content file to a particular client; and
the particular client is operable to initiate display of a first one of the portions prior to receiving all the decoded or encoded portions of the content file.

49. The system of claim 40, further comprising means for generating a graphic representation of a content file based on information in the content file,
and means for transmitting or causing to be transmitted the graphic representation to a particular client.

50. The system of claim 49, wherein the graphic representation comprises a thumbnail representation of a portion of the content file.

51. The system of claim 40, further comprising a means for storing a plurality of content files.

52. The system of claim 40, further comprising a means for caching one or more decoded or encoded portions of one or more content files.

53. The system of claim 52, wherein decoded or encoded portions of content files are stored in the means for caching in response to a frequency of requests by clients for the decoded or encoded portions of the content files.

54. The system of claim 40, further comprising:
means for determining whether a content file comprises prohibited content; and
if the content file comprises prohibited content, deny a request associated with the content file.

55. The system of claim 54, wherein the request is to download the content file.

56. The system of claim 54, wherein the request is to upload the content file.

57. The system of claim 54, wherein the logic is further operable when executed to determine whether the content file comprises prohibited content by determining whether the first content file comprises copyrighted content.

58. The system of claim 54, wherein the logic is further operable when executed to determine whether the content file comprises prohibited content by determining whether the content file comprises pornographic content.

59. The system of claim 54, wherein the logic is further operable when executed to determine whether the content file comprises prohibited content by:
scanning the content file to generate an identifier for the content file; and
comparing the identifier to one or more prohibited-content identifiers.

60. The system of claim 40, wherein at least one of the second means is operable to:
determine whether fading characteristics of a content file satisfies one or more predetermined fading criteria; and
adjust the fading characteristics if they do not satisfy the predetermined fading criteria.

61. The system of claim 40, wherein at least one of the second means is operable to:
determine a preferred resolution for a content file; and
adjust a resolution of the content file to match substantially the preferred resolution.

* * * * *